(12) United States Patent
Liu et al.

(10) Patent No.: US 10,407,065 B2
(45) Date of Patent: Sep. 10, 2019

(54) METHOD, DEVICE AND APPARATUS FOR PLANNING VEHICLE SPEED

(71) Applicants: NEUSOFT CORPORATION, Shenyang (CN); NEUSOFT REACH AUTOMOTIVE TECHNOLOGY (SHANGHAI) CO., LTD., Shanghai (CN)

(72) Inventors: Wei Liu, Shenyang (CN); Cheng Chi, Shenyang (CN); Guangsheng Zhang, Shenyang (CN); Lu Wei, Shenyang (CN); Wanli Ma, Shenyang (CN)

(73) Assignees: NEUSOFT CORPORATION, Shenyang (CN); NEUSOFT REACH AUTOMOTIVE TECHNOLOGY (SHANGHAI) CO., LTD, Shanghai (CN)

( * ) Notice: Subject to any disclaimer, the term of this patent is extended or adjusted under 35 U.S.C. 154(b) by 200 days.

(21) Appl. No.: 15/618,125

(22) Filed: Jun. 9, 2017

(65) Prior Publication Data

US 2018/0186373 A1    Jul. 5, 2018

(30) Foreign Application Priority Data

Dec. 30, 2016 (CN) .......................... 2016 1 1262731

(51) Int. Cl.
*B60W 30/14*    (2006.01)

(52) U.S. Cl.
CPC ....... *B60W 30/143* (2013.01); *B60W 2420/42* (2013.01); *B60W 2420/52* (2013.01);
(Continued)

(58) Field of Classification Search
CPC ......... B60W 30/143; B60W 2720/125; B60W 2550/143; B60W 2550/402;
(Continued)

(56) References Cited

U.S. PATENT DOCUMENTS

| 5,703,780 A | 12/1997 | Takanabe et al. |
| 6,208,927 B1 | 3/2001 | Mine et al. |

(Continued)

FOREIGN PATENT DOCUMENTS

| CN | 1668938 A | 9/2005 |
| CN | 101497336 A | 8/2009 |

(Continued)

OTHER PUBLICATIONS

Machine translation JP2008-074232, 2008 (Year: 2008).*

(Continued)

*Primary Examiner* — Frederick M Brushaber
(74) *Attorney, Agent, or Firm* — Kilpatrick Townsend & Stockton LLP

(57) ABSTRACT

A method, a device and an apparatus for planning a vehicle speed are provided. The method includes: determining initial planning speeds at a target path point and a reference path point based on curvature radiuses of a target front road and a reference front road, such that first and second lateral accelerations are not greater than a lateral acceleration threshold; and determining a target longitudinal acceleration and a target planning speed at the target path point based on the initial planning speeds at the target path point and the reference path point and a reference journey, such that the target longitudinal acceleration is in a defined range. Therefore, a vehicle can drive based on the target planning speed and the target longitudinal acceleration at the target path point, thereby avoiding drastic deceleration and lateral offset, improving driving safety of the vehicle and riding comfort and saving energy.

10 Claims, 6 Drawing Sheets

(52) U.S. Cl.
CPC . *B60W 2520/105* (2013.01); *B60W 2520/125* (2013.01); *B60W 2550/10* (2013.01); *B60W 2550/143* (2013.01); *B60W 2550/146* (2013.01); *B60W 2550/402* (2013.01); *B60W 2720/10* (2013.01); *B60W 2720/125* (2013.01)

(58) Field of Classification Search
CPC ......... B60W 2420/42; B60W 2720/10; B60W 2520/105; B60W 2520/125; B60W 2550/10; B60W 2550/146; B60W 2420/52

See application file for complete search history.

(56) References Cited

U.S. PATENT DOCUMENTS

| | | | | |
|---|---|---|---|---|
| 6,298,296 | B1* | 10/2001 | Takahashi | B60K 31/0066 |
| | | | | 701/532 |
| 6,401,023 | B1* | 6/2002 | Takahashi | G01C 21/3697 |
| | | | | 340/441 |
| 6,553,311 | B2 | 4/2003 | Ahearn et al. | |
| 8,412,433 | B2 | 4/2013 | Yasui et al. | |
| 8,977,464 | B1* | 3/2015 | Takahashi | B60W 30/025 |
| | | | | 701/70 |
| 9,573,597 | B2* | 2/2017 | Uno | B60W 40/09 |
| 9,643,607 | B2* | 5/2017 | Nagatsuka | B60T 8/17555 |
| 9,862,380 | B2 | 1/2018 | Minoiu Enache et al. | |
| 10,173,677 | B2* | 1/2019 | Fairgrieve | B60W 30/143 |
| 2002/0045981 | A1* | 4/2002 | Ichikawa | B60K 23/0808 |
| | | | | 701/91 |
| 2010/0161192 | A1* | 6/2010 | Nara | B60W 10/06 |
| | | | | 701/70 |
| 2010/0292904 | A1* | 11/2010 | Taguchi | B60W 30/143 |
| | | | | 701/93 |
| 2012/0277965 | A1* | 11/2012 | Takahashi | B60W 30/143 |
| | | | | 701/70 |
| 2012/0326856 | A1* | 12/2012 | Levin | B60W 50/0097 |
| | | | | 340/441 |
| 2013/0131947 | A1* | 5/2013 | Takahashi | B60T 7/042 |
| | | | | 701/70 |
| 2014/0207307 | A1* | 7/2014 | Jonsson | B60W 50/14 |
| | | | | 701/1 |
| 2015/0094927 | A1* | 4/2015 | Takahashi | B60W 30/045 |
| | | | | 701/93 |
| 2015/0197225 | A1* | 7/2015 | Raste | B60W 30/18145 |
| | | | | 701/72 |
| 2015/0317847 | A1* | 11/2015 | Prakah-Asante | G07C 5/08 |
| | | | | 701/1 |
| 2015/0353085 | A1* | 12/2015 | Lee | B60W 30/10 |
| | | | | 701/533 |
| 2016/0318513 | A1* | 11/2016 | Lee | B60W 30/143 |

FOREIGN PATENT DOCUMENTS

| | | |
|---|---|---|
| CN | 105722739 A | 6/2016 |
| JP | H08194896 A | 7/1996 |
| JP | H08201093 A | 8/1996 |
| JP | H08263792 A | 10/1996 |
| JP | 2005170327 A | 6/2005 |
| JP | 2006048409 A | 2/2006 |
| JP | 2006201874 A | 8/2006 |
| JP | 2008074232 A | 4/2008 |
| WO | 2004008648 A2 | 1/2004 |

OTHER PUBLICATIONS

JP First Office Action dated Jul. 31, 2018 in the corresponding Japanese application (application No. 2017-127202).
CN First Office Action dated Jul. 31, 2018 in the corresponding Chinese application (application No. 201611262731.9).

* cited by examiner

US 10,407,065 B2

METHOD, DEVICE AND APPARATUS FOR PLANNING VEHICLE SPEED

CROSS REFERENCE OF RELATED APPLICATION

This application claims priority to Chinese patent application No. 201611262731.9 titled "METHOD, DEVICE AND APPARATUS FOR PLANNING VEHICLE SPEED" and filed with the Chinese State Intellectual Property Office on Dec. 30, 2016, which is incorporated herein by reference in its entirety.

FIELD

The present disclosure relates to the technical field of information processing, and in particular to a method, a device and an apparatus for planning a vehicle speed.

BACKGROUND

A current automobile intelligence system can not only provide a planning solution of a navigation path for a driver, but also provide a planning solution of a vehicle speed, to control the vehicle speed during a driving process of the vehicle. In the conventional technology, the vehicle speed is generally controlled based on a front obstacle of a current position of the vehicle. Particularly, the system may obtain a detection result of the front obstacle of the vehicle by a detection apparatus such as a radar and a camera, and then plans a suitable vehicle speed to follow the front obstacle based on a position and a speed of the front obstacle and a movement state and an operation state of the vehicle itself, such that the vehicle speed is controlled with the planned vehicle speed during a driving process of the vehicle.

It is found by the inventor's study that: in one aspect, the detection apparatus such as a radar and a camera can start and obtain a relatively accurate detection result in a case of a vehicle speed quick enough, this results in that vehicle speed planning does not apply to a slow vehicle speed. In the other aspect, in a case that no front obstacle is detected or a detected front obstacle is too far, the vehicle speed is planned without any limitation to be too high, which cannot ensure safe driving of the vehicle, and can bring a discomfort to passengers in the vehicle and waste energy.

SUMMARY

A technical problem to be solved by the present disclosure is to provide a method, a device and an apparatus for planning a vehicle speed, such that the vehicle speed planning can apply to a wider speed range, driving safety of vehicle and a riding comfort are improved, and energy is saved.

In a first aspect, a method for planning a vehicle speed is provided, which includes:
  determining, based on a curvature radius of a target front road, an initial planning speed at a target path point, to ensure that a first lateral acceleration is not greater than a lateral acceleration threshold, where the target front road is a segment of path taking the target path point as a starting point on a planning path, and the first lateral acceleration is a lateral acceleration generated when driving at the initial planning speed at the target path point on the target front load;
  determining, based on a curvature radius of a reference front road, an initial planning speed at a reference path point, to ensure that a second lateral acceleration is not greater than the lateral acceleration threshold, where the reference front road is a segment of path taking the reference path point as a starting point on the planning path, and the second lateral acceleration is a lateral acceleration generated when driving at the initial planning speed at the reference path point on the reference front road; and
  determining a target longitudinal acceleration and a target planning speed at the target path point based on the initial planning speed at the target path point, the initial planning speed at the reference path point and a reference journey, to ensure that the target longitudinal acceleration is in a defined range of longitudinal accelerations, where the reference journey indicates a journey from the target path point to the reference path point on the planning path, and the target longitudinal acceleration indicates an acceleration required for a change from the target planning speed to the initial planning speed at the reference path point on the reference journey.

Optionally, a target destination may be a first initial destination which is closest to the target path point on the planning path, the target destination may be a destination of the target front road, and a straight-line distance between the first initial destination and the target path point may be equal to a preset distance threshold; and
  a reference destination may be a second initial destination which is closest to the reference path point on the planning path, the reference destination may be a destination of the reference front road, and a straight-line distance between the second initial destination and the reference path point may be equal to the preset distance threshold.

Optionally, the method may further include:
  Calculating, based on a length of a first segment, a length of a second segment and an angle between the first segment and the second segment, a length of a third segment as the curvature radius of the target front road, where two endpoints of the third segment are a curvature center and a middle point of the target front road respectively, the curvature center of the target front road is an intersection of a first vertical line and a second vertical line, the first vertical line is perpendicular to a fourth segment and passes through a middle point of the fourth segment, the second vertical line is perpendicular to a fifth segment and passes through a middle point of the fifth segment, two endpoints of the first segment are the middle point of the fourth segment and the middle point of the target front road respectively, two endpoints of the second segment are the middle point of the fifth segment and the middle point of the target front road respectively, two endpoints of the fourth segment are the target path point and the middle point of the target front road respectively, and two endpoints of the fifth segment are a destination and the middle point of the target front road respectively; and
  Calculating, based on a length of a sixth segment, a length of a seventh segment and an angle between the sixth segment and the seventh segment, a length of an eight segment as the curvature radius of the reference front road, where two endpoints of the eighth segment are a curvature center and a middle point of the reference front road respectively, the curvature center of the reference front road is an intersection of a third vertical line and a fourth vertical line, the third vertical line is perpendicular to a ninth segment and passes through a middle point of the ninth segment, the fourth vertical line is perpendicular to a tenth segment and passes through a middle point of the tenth segment, two endpoints of the sixth segment are the middle point of the ninth segment and the middle point of the reference front road respectively, two endpoints of the seventh segment are the middle point of the tenth segment and the middle point of the reference front road respectively, two endpoints of the ninth segment are the reference path point and the middle point of the reference front path respectively, and two endpoints of the tenth segment are a destination and the middle point of the reference front road respectively.

Optionally, the reference journey may be equal to a product of the initial planning speed at the target path point and a preset time threshold.

Optionally, the determining the target longitudinal acceleration and the target planning speed at the target path point based on the initial planning speed at the target path point, the initial planning speed at the reference path point and the reference journey, to ensure that the target longitudinal acceleration is in the defined range of longitudinal accelerations may include:

calculating an initial longitudinal acceleration based on the initial planning speed at the target path point, the initial planning speed at the reference path point and the reference journey, where the initial longitudinal acceleration indicates an acceleration required for a change from the initial planning speed at the target path point to the initial planning speed at the reference path point on the reference journey;

determining the initial longitudinal acceleration at the target path point as the target longitudinal acceleration and determining the initial planning speed at the target path point as the target planning speed, if the initial longitudinal acceleration at the target path point indicates a decelerated movement and an absolute value of the initial longitudinal acceleration at the target path point does not exceed a longitudinal acceleration threshold, or if the initial longitudinal acceleration at the target path point does not indicate a decelerated movement; and reducing the initial planning speed at the target path point and calculating the initial longitudinal acceleration again, if the initial longitudinal acceleration at the target path point indicates the decelerated movement and the absolute value of the initial longitudinal acceleration at the target path point exceeds the longitudinal acceleration threshold.

Optionally, the method may further include:

saving the target planning speed and the target longitudinal acceleration into planning information on the target path point, where the planning information on the target path point further includes longitude and latitude information on the target path point.

Optionally, the planning information on the target path point may further include a planning course and/or the curvature radius at the target path point, the planning course at the target path point may indicate a driving direction at the target path point, and the curvature radius at the target path point may be the curvature radius at the target front road.

Optionally, the method may further include:

acquiring longitude and latitude information on a current driving position during a driving process of a vehicle;

extracting the longitude and latitude information on the target path point from the planning information on the target path point; and extracting the target planning speed and the target longitudinal acceleration from the planning information on the target path point and controlling the vehicle speed based on the target planning speed and the target longitudinal acceleration, if the longitude and latitude information on the current driving position matches with the longitude and latitude information on the target path point.

In a second aspect, a device for planning a vehicle speed is provided, which includes:

a first determining unit configured to determine, based on a curvature radius of a target front road, an initial planning speed at a target path point, to ensure that a first lateral acceleration is not greater than a lateral acceleration threshold, where the target front road is a segment of path taking the target path point as a starting point on a planning path, and the first lateral acceleration is a lateral acceleration generated when driving at the initial planning speed at the target path point on the target front road;

a second determining unit configured to determine, based on a curvature radius of a reference front road, an initial planning speed at a reference path point, to ensure that a second lateral acceleration is not greater than the lateral acceleration threshold, where the reference front road is a segment of path taking the reference path point as a starting point on the planning path, and the second lateral acceleration is a lateral acceleration generated when driving at the initial planning speed at the reference path point on the reference front road; and a third determining unit configured to determine a target longitudinal acceleration and a target planning speed at the target path point based on the initial planning speed at the target path point, the initial planning speed at the reference path point and a reference journey, to ensure that the target longitudinal acceleration is in a range of longitudinal accelerations, where the reference journey indicates a journey from the target path point to the reference path point on the planning path, and the target longitudinal acceleration indicates an acceleration required for a change from the target planning speed to the initial planning speed at the reference path point on the reference journey.

Optionally, a target destination may be a first initial destination which is closest to the target path point on the planning path, the target destination may be a destination of the target front road, and a straight-line distance between the first initial destination and the target path point may be equal to a preset distance threshold; and a reference destination may be a second initial destination which is closest to the reference path point on the planning path, the reference destination may be a destination of the reference front road, and a straight-line distance between the second initial destination and the reference path point may be equal to the preset distance threshold.

Optionally, the device may further include:

a first calculating unit configured to calculate, based on a length of a first segment, a length of a second segment and an angle between the first segment and the second segment, a length of a third segment as the curvature radius of the target front road, where two endpoints of the third segment are a curvature center and a middle point of the target front road respectively, the curvature center of the target front road is an intersection of a first vertical line and a second vertical line, the first vertical line is perpendicular to a fourth segment and passes through a middle point of the fourth segment, the second vertical line is perpendicular to a fifth segment and passes through a middle point of the fifth segment, two endpoints of the first segment are the middle point of the fourth segment and the middle point of the target front road respectively, two endpoints of the second segment are the middle point of the fifth segment and the middle point of the target front road respectively, two endpoints of the fourth segment are the target path point and the middle point of the target front road respectively, and two endpoints of the fifth segment are a destination and the middle point of the target front point respectively; and a second calculating unit configured to calculate, based on a length of a sixth segment, a length of a seventh segment and an angle between the sixth segment and the seventh segment, a length of an eight segment as the curvature radius of the reference front road, where two endpoints of the eighth segment are a curvature center and a middle point of the reference front road respectively, the curvature center of the reference front road is an intersection of a third vertical line and a fourth vertical line, the third vertical line is perpendicular to a ninth segment and passes through a middle point of the ninth segment, the fourth vertical line is perpendicular to a tenth segment and passes through a middle point of the tenth segment, two endpoints of the sixth segment are the middle point of the ninth segment and the middle point of the reference front road respectively, two endpoints of the seventh segment are the middle point of the tenth segment and the middle point of the reference front road respectively, two endpoints of the ninth segment are the reference path point and the middle point of the reference front path respectively, and two endpoints of the tenth segment are a destination and the middle point of the reference front road respectively.

Optionally, the reference journey may be equal to a product of the initial planning speed at the target path point and a preset time threshold.

Optionally, the third determining unit may include:

a calculating subunit configured to calculate an initial longitudinal acceleration based on the initial planning speed at the target path point, the initial planning speed at the reference path point and the reference journey, where the initial longitudinal acceleration indicates an acceleration required for a change from the initial planning speed at the target path point to the initial planning speed at the reference path point on the reference journey;

a determining subunit configured to determine the initial longitudinal acceleration at the target path point as the target longitudinal acceleration and determine the initial planning speed at the target path point as the target planning speed, if the initial longitudinal acceleration at the target path point indicates a decelerated movement and an absolute value of the initial longitudinal acceleration at the target path point does not exceed a longitudinal acceleration threshold, or if the initial longitudinal acceleration at the target path point does not indicate a decelerated movement; and a decelerating subunit configured to reduce the initial planning speed at the target path point and trigger the calculating subunit, if the initial longitudinal acceleration at the target path point indicates the decelerated movement and the absolute value of the initial longitudinal acceleration at the target path point exceeds the longitudinal acceleration threshold.

Optionally, the device may further include:

a saving unit configured to save the target planning speed and the target longitudinal acceleration into planning information on the target path point, where the planning information on the target path point further includes longitude and latitude information on the target path point.

Optionally, the planning information on the target path point may further include a planning course and/or the curvature radius at the target path point, the planning course at the target path point indicates a driving direction at the target path point, and the curvature radius at the target path point is the curvature radius of the target front road.

Optionally, the device may further include:

an acquiring unit configured to acquire longitude and latitude information on a current driving position during a driving process of a vehicle;

an extracting unit configured to extract the longitude and latitude information on the target path point from the planning information on the target path point; and a vehicle speed controlling unit configured to extract the target planning speed and the target longitudinal acceleration from the planning information on the target path point and control the vehicle speed based on the target planning speed and the target longitudinal acceleration, if the longitude and latitude information on the current driving position matches with the longitude and latitude information on the target path point.

In a third aspect, an apparatus for planning a vehicle speed is provided, which includes a processor, a memory, a communication interface and a bus system, where the bus system is configured to couple hardware components of the apparatus together;

the communication interface is configured to perform communication connection between the apparatus and at least one other apparatus;

the memory is configured to store program instructions and data; and the processor is configured to read the instructions and the data stored in the memory to:

determine, based on a curvature radius of a target front road, an initial planning speed at a target path point, to ensure that a first lateral acceleration is not greater than a lateral acceleration threshold, where the target front road is a segment of path taking the target path point as a starting point on a planning path, and the first lateral acceleration is a lateral acceleration generated when driving at the initial planning speed at the target path point on the target front road;

determine, based on a curvature radius of a reference front road, an initial planning speed at a reference path point, to ensure that a second lateral acceleration is not greater than the lateral acceleration threshold, where the reference front road is a segment of path taking the reference path point as a starting point on the planning path, and the second lateral acceleration is a lateral acceleration generated when driving at the initial planning speed at the reference path point on the reference front path; and determine a target longitudinal acceleration and a target planning speed at the target path point based on the initial planning speed at the target path point, the initial planning speed at the reference path point and a reference journey, to ensure that the target longitudinal acceleration is in a defined range of longitudinal accelerations, where the reference journey indicates a journey from the target path point to the reference path point on the planning path, and the target longitudinal acceleration indicates an acceleration required for a change from the target planning speed to the initial planning speed at the reference path point on the reference journey.

Optionally, a target destination may be a first initial destination which is closest to the target path point on the planning path, the target destination may be a destination of the target front road, and a straight-line distance between the first initial destination and the target path point may be equal to a preset distance threshold; and a reference destination may be a second initial destination which is closest to the reference path point on the planning path, the reference destination may be a destination of the reference front road, and a straight-line distance between the second initial destination and the reference path point may be equal to the preset distance threshold.

Optionally, the processor may be further configured to:
Calculate, based on a length of a first segment, a length of a second segment and an angle between the first segment and the second segment, a length of a third segment as the curvature radius of the target front road, where two endpoints of the third segment are a curvature center and a middle point of the target front road respectively, the curvature center of the target front road is an intersection of a first vertical line and a second vertical line, the first vertical line is perpendicular to a fourth segment and passes through a middle point of the fourth segment, the second vertical line is perpendicular to a fifth segment and passes through a middle point of the fifth segment, two endpoints of the first segment are the middle point of the fourth segment and the middle point of the target front road respectively, two endpoints of the second segment are the middle point of the fifth segment and the middle point of the target front road respectively, two endpoints of the fourth segment are the target path point and the middle point of the target front road respectively, and two endpoints of the fifth segment are a destination and the middle point of the target front point respectively; and Calculate, based on a length of a sixth segment, a length of a seventh segment and an angle between the sixth segment and the seventh segment, a length of an eight segment as the curvature radius of the reference front road, where two endpoints of the eighth segment are a curvature center and a middle point of the reference front road respectively, the curvature center of the reference front road is an intersection of a third vertical line and a fourth vertical line, the third vertical line is perpendicular to a ninth segment and passes through a middle point of the ninth segment, the fourth vertical line is perpendicular to a tenth segment and passes through a middle point of the tenth segment, two endpoints of the sixth segment are the middle point of the ninth segment and the middle point of the reference front road respectively, two endpoints of the seventh segment are the middle point of the tenth segment and the middle point of the reference front road respectively, two endpoints of the ninth segment are the reference path point and the middle point of the reference front path respectively, and two endpoints of the tenth segment are a destination and the middle point of the reference front road respectively.

Optionally, the reference journey may be equal to a product of the initial planning speed at the target path point and a preset time threshold.

Optionally, in order to determine the target longitudinal acceleration and the target planning speed at the target path point, the processor is configured to:
calculate an initial longitudinal acceleration based on the initial planning speed at the target path point, the initial planning speed at the reference path point and the reference journey, where the initial longitudinal acceleration indicates an acceleration required for a change from the initial planning speed at the target path point to the initial planning speed at the reference path point on the reference journey;
determine the initial longitudinal acceleration at the target path point as the target longitudinal acceleration and determine the initial planning speed at the target path point as the target planning speed, if the initial longitudinal acceleration at the target path point indicates a decelerated movement and an absolute value of the initial longitudinal acceleration at the target path point does not exceed a longitudinal acceleration threshold, or if the initial longitudinal acceleration at the target path point does not indicate a decelerated movement; and
reduce the initial planning speed at the target path point and calculate the initial longitudinal acceleration again, if the initial longitudinal acceleration at the target path point indicates a decelerated movement and the absolute value of the initial longitudinal acceleration at the target path point exceeds the longitudinal acceleration threshold.

Optionally, the processor may be further configured to:
save the target planning speed and the target longitudinal acceleration into planning information on the target path point, where the planning information on the target path point further includes longitude and latitude information on the target path point.

The planning information on the target path point may further include a planning course and/or the curvature radius at the target path point, the planning course at the target path point may indicate a driving direction at the target path point, and the curvature radius at the target path point may be the curvature radius of the target front road.

Optionally, the processor may be further configured to:
acquire longitude and latitude information on a current driving position during a driving process of a vehicle;
extract the longitude and latitude information on the target path point from the planning information on the target path point; and
extract the target planning speed and the target longitudinal acceleration from the planning information on the target path point and control the vehicle speed based on the target planning speed and the target longitudinal acceleration, if the longitude and latitude information on the current driving position matches with the longitude and latitude information on the target path point.

According to the embodiments provided by the present disclosure, for the target path point on the planning path, the target planning speed and the target longitudinal acceleration at the target path point for controlling the vehicle speed are determined based on the planning path itself, the lateral acceleration threshold and the defined range of the longitudinal accelerations. It follows that, in one aspect, the planning path may be obtained by a navigation apparatus, the navigation apparatus is not like the detection apparatus such as the radar and the camera which can only be used in a certain vehicle speed, therefore the vehicle speed planning can apply to a wider speed range. In the other aspect, in planning a vehicle speed for a target path point, a lateral acceleration at the target path point is limited by the lateral acceleration threshold and a target longitudinal acceleration at the target path point is limited in the defined range of the longitudinal accelerations, such that a vehicle controlled to drive at the target planning speed and the target longitudinal acceleration at the target path point can avoid drastic deceleration and lateral offset, thereby improving driving safety of the vehicle and a riding comfort of passengers in the vehicle and saving energy.

BRIEF DESCRIPTION OF THE DRAWINGS

In order to illustrate technical solutions in embodiments of the present disclosure more clearly, drawings for description of the embodiments are introduced simply hereinafter. Apparently, the drawings described in the following only describe some embodiments of the present disclosure, and other drawings may be obtained based on these drawings for those skilled in the art.

DETAILED DESCRIPTION OF EMBODIMENTS

In order to enable those skilled in the art to understand solutions in the present disclosure better, technical solutions in embodiments of the present disclosure are described clearly and completely in conjunction with drawings in the embodiments of the present disclosure hereinafter. Apparently, the described embodiments are only some rather than all of the embodiments of the present disclosure. Any other embodiments obtained based on the embodiments of the present disclosure by those skilled in the art without any creative work fall within the scope of protection of the present disclosure.

It is found by the inventor's study that: in one aspect, a detection apparatus such as a radar and a camera can start and obtain a relatively accurate detection result in a case of a vehicle speed quick enough, for example above 40 km/h, this results in that vehicle speed planning does not apply to a slow vehicle speed, that is, not applying to all vehicle speeds, and a cost of the detection apparatus such as the radar and the camera is high; in the other aspect, in a case that no front obstacle is detected or a detected front obstacle is too far, a vehicle speed can not be set or adjusted based on related environmental information, that is, the vehicle speed is planned without any limitation to be very high, which cannot ensure safe driving of the vehicle and can bring an uncomfortable feeling to passengers in the vehicle, and waste energy.

In order to solve the above problems, in embodiments of the present disclosure, for a target path point on a planning path, a target planning speed and a target longitudinal acceleration for controlling a vehicle speed at the target path point are determined based on the planning path itself, a lateral acceleration threshold and a defined range of longitudinal accelerations. It follows that, in one aspect, the planning path may be obtained by a navigation apparatus, the navigation apparatus is not like the detection apparatus such as the radar and the camera which can only be used in a certain vehicle speed, therefore the vehicle speed planning can apply to a wider speed range. In the other aspect, in planning a vehicle speed for a target path point, a lateral acceleration at the target path point is limited by the lateral acceleration threshold and a target longitudinal acceleration at the target path point is limited in the defined range of the longitudinal accelerations, such that a vehicle controlled to drive at the target planning speed and the target longitudinal acceleration at the target path point can avoid drastic deceleration and lateral offset, thereby improving driving safety of the vehicle and a riding comfort of passengers in the vehicle and saving energy.

Figure 1:
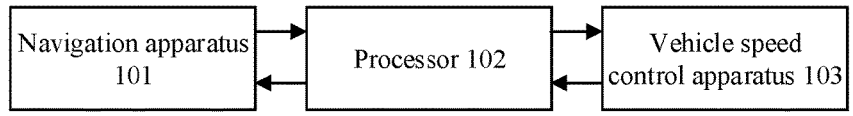
FIG. 1 is a schematic diagram of a framework of a system related to an application scene according to an embodiment of the present disclosure.

For example, a scene according to an embodiment of the present disclosure may be a scene shown in FIG. 1. The scene includes: a navigation apparatus 101, a processor 102 and a vehicle speed control apparatus 103. The navigation apparatus 101 and the processor 102 may interact with each other, and the processor 102 and the vehicle speed control apparatus 103 may interact with each other. The navigation apparatus 101 transmits information on the planning path to the processor 102. Then, the processor 102 determines an initial planning speed at a target path point based on a curvature radius of a target front road, such that a first lateral acceleration is not greater than a lateral acceleration threshold. The target front road is a segment of path taking the target path point as a starting point on the planning path, and the first lateral acceleration is a lateral acceleration generated when driving at the initial planning speed at the target path point on the target front road. The processor 102 determines an initial planning speed at a reference path point based on a curvature radius of a reference front road, such that a second lateral acceleration is not greater than a lateral acceleration threshold. The reference front road is a segment of path taking the reference path point as a starting point on the planning path, and the second lateral acceleration is a lateral acceleration generated when driving at the initial planning speed at the reference path point on the reference front road. Then, the processor 102 determines a target longitudinal acceleration and a target planning speed at the target path point based on the initial planning speed at the target path point, the initial planning speed at the reference path point and a reference journey, such that the target longitudinal acceleration is in a defined range of longitudinal accelerations. The reference journey is a journey from the target path point to the reference path point on the planning path. The target longitudinal acceleration indicates an acceleration required for a change from the target planning speed to the initial planning speed at the reference path point on the reference journey. In an actual driving process of a vehicle, the processor 102 outputs a vehicle speed control instruction to the vehicle speed control apparatus 103 based on the target longitudinal acceleration and the target planning speed.

It should be understood that, in the above application scene, although actions described in the embodiment of the present disclosure are performed by the processor 102, the actions may be performed by other device, as long as the other device performs the actions disclosed in the embodiment of the present disclosure.

It should be understood that, the above scene is only a scene example according to the embodiment of the present disclosure, which is not limited in the embodiment of the present disclosure.

Hereinafter specific implementations of a method, a device and an apparatus for planning a vehicle speed in embodiments of the present disclosure are described in detail in conjunction with drawings.

Figure 2:
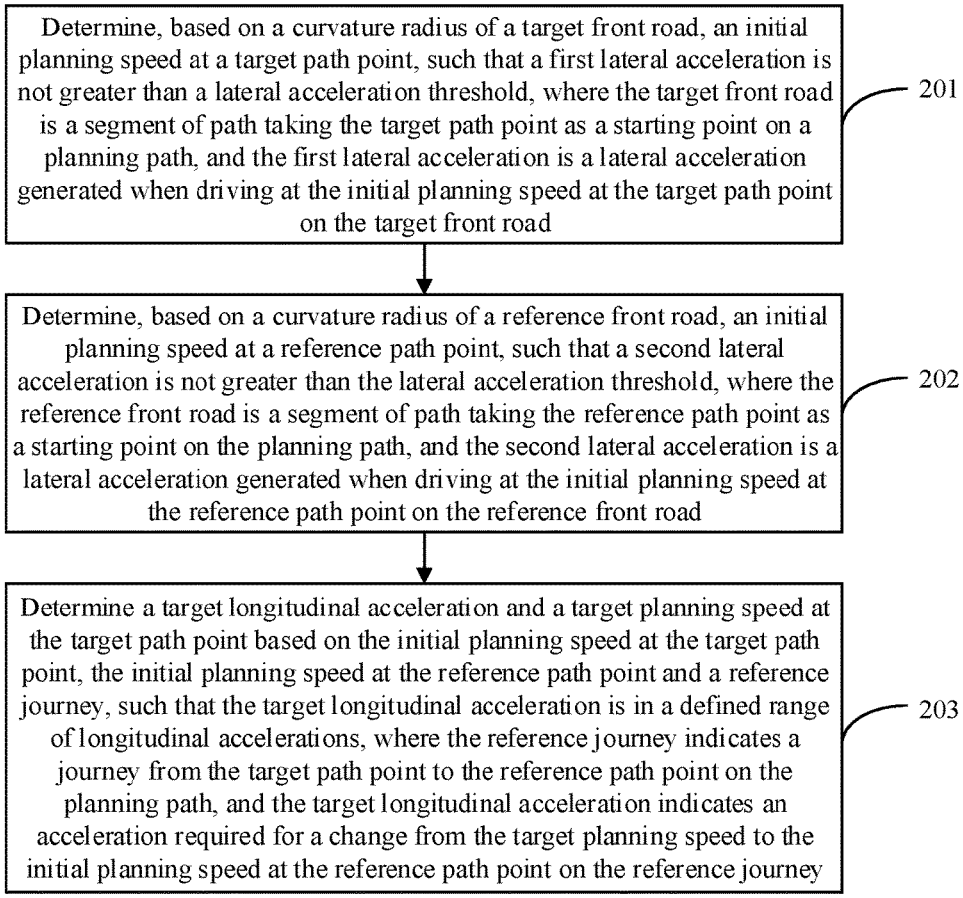
FIG. 2 is a schematic flowchart of a method for planning a vehicle speed according to an embodiment of the present disclosure.

Reference is made to FIG. 2 which shows a schematic flowchart of a method for planning a vehicle speed according to an embodiment of the present disclosure. In the embodiment, the method may include following steps 201 to 203, for example.

In step 201, an initial planning speed at a target path point is determined based on a curvature radius of a target front road, such that a first lateral acceleration is not greater than a lateral acceleration threshold. The target front road is a segment of path taking the target path point as a starting point on a planning path, and the first lateral acceleration is a lateral acceleration generated when driving at the initial planning speed at the target path point on the target front road.

In step 202, an initial planning speed at a reference path point is determined based on a curvature radius of a reference front road, such that a second lateral acceleration is not greater than the lateral acceleration threshold. The reference front road is a segment of path taking the reference path point as a starting point on the planning path, and the second lateral acceleration is a lateral acceleration generated when driving at the initial planning speed at the reference path point on the reference front road.

Specifically, a planning path for a vehicle may be generated based on an input driving starting point and an input driving destination, and an initial planning speed is determined for each path point on the planning path. It should be understood that, the target path point and the reference path point are two different path points on the planning path. In the embodiment, an order for determining initial planning speeds at path points may be not limited. That is, in the embodiment, an order for performing step S201 and step S202 is not limited. For example, step S202 may be performed after step S201 is performed, step S201 may be performed after step S202 is performed, or step S201 and step S202 may be performed simultaneously.

For any path point on the planning path, an initial planning speed at the path point is used to limit a lateral acceleration generated when a vehicle drives at the path point to be less than a preset lateral acceleration threshold, thereby improving driving safety and a riding comfort. Since the lateral acceleration at the path point is related to a driving speed and a curvature radius at the path point, the initial planning speed at the path point may be determined based on the lateral acceleration threshold and the curvature radius at the path point.

Figure 3:
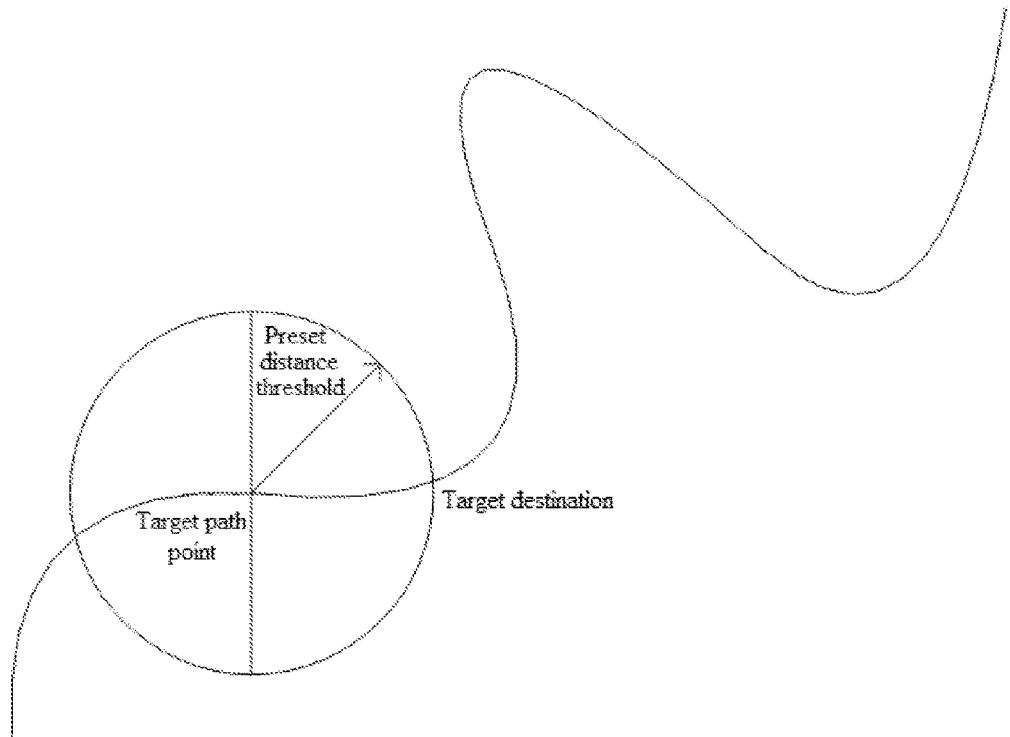
FIG. 3 is a schematic diagram of a path of a target front road according to an embodiment of the present disclosure.

In the embodiment, for any path point on the planning path, a curvature radius at the path point may be indicated by a curvature radius of a segment path taking the path point as a starting point on the planning path. The segment of path may be regarded as a front road of the path point on the planning path, and a destination of the segment of path may be determined based on a position of the path point itself and a preset distance threshold. Specifically, an initial destination is used to indicate other path point to which a straight-line distance from the path point is equal to the preset distance threshold on the planning path, and a destination of the front road of the path point may be an initial destination which is closest to the path point on the planning path. For example, for a target path point on the planning path, a target destination is a first initial destination which is closest to the target path point on the planning path, the target destination is a destination of the target front road, and a straight-line distance between the first initial destination and the target path point is equal to the preset distance threshold. The target destination is a path point ahead of a course of the target path point. In an example shown in FIG. 3, a circle is drawn by taking the target path point as a center and taking the preset distance threshold as a radius, and an intersection of the circle and the planning path is a first initial destination. When there are multiple first initial destinations, a first initial destination which is closest to the target path point ahead of a course of the target path point is the target destination, according to a planning course of the target path point. That is, according to the planning course of the target path point, a right intersection among a left intersection and the right intersection of the circle and the planning path is the target destination. For a reference path point on the planning path, a reference destination is a second initial destination which is closest to the reference path point on the planning path, the reference destination is a destination of the reference front road, and a straight-line distance between the second initial destination and the reference path point is equal to the preset distance threshold. The reference destination is a path point ahead of the course of the target path point.

It should be noted that, for any path point on the planning path, a front road of the path point is determined if a destination of the front road of the path point is determined. A curvature radius may be determined for the front road of the path point, to determine an initial planning speed at the path point. In some implementations of the embodiment, for simplifying calculation of the curvature radius, an approximation algorithm may be used. That is, the front road of the path point may be approximately regarded as an arc, and a radius of the arc is calculated as the curvature radius at the path point.

For example, for the target path point on the planning path, before step S201, the method according to the embodiment may further include: calculating, based on a length of a first segment, a length of a second segment and an angle between the first segment and the second segment, a length of a third segment as the curvature radius of the target front road. Two endpoints of the third segment are a curvature center and a middle point of the target front road respectively, the curvature center of the target front road is an intersection of a first vertical line and a second vertical line, the first vertical line is perpendicular to a fourth segment and passes through a middle point of the fourth segment, the second vertical line is perpendicular to a fifth segment and passes through a middle point of the fifth segment, two endpoints of the first segment are the middle point of the fourth segment and the middle point of the target front road respectively, two endpoints of the second segment are the middle point of the fifth segment and the middle point of the target front road respectively, two endpoints of the fourth segment are the target path point and the middle point of the target front road respectively, and two endpoints of the fifth segment are a destination and the middle point of the target front point respectively. In an example shown in FIG. 4, if A indicates a target path point and C indicates a target destination, a path AC is a target front road. B is a middle point of the path AC, D is a middle point of AB, E is a middle point of BC, a vertical line of AB passing through D and a vertical line of BC passing through E interest at O, therefore O is a curvature center of the target front road, DO is first vertical line, EO is a second vertical line, BD is a first segment, BE is a second segment, AB is a fourth segment, BC is a fifth segment, and a is an angle between AB and BC, i.e., an angle between the first segment and the second segment. A length of the third segment BO may be calculated based on a length of the first segment BD, a length of the second segment BE and the angle α between the first segment BD and the second segment BE. The length of the third segment BO is the curvature radius of the target front road. The third segment BO is calculated from the following equations: $\alpha_1+\alpha_2=\alpha$, BD/2 cos $\alpha_1$=BE/2 cos $\alpha_2$=BO, wherein, α1 indicates an angle between AB and BO, and α2 indicates an angle between BC and BO.

Figure 4:
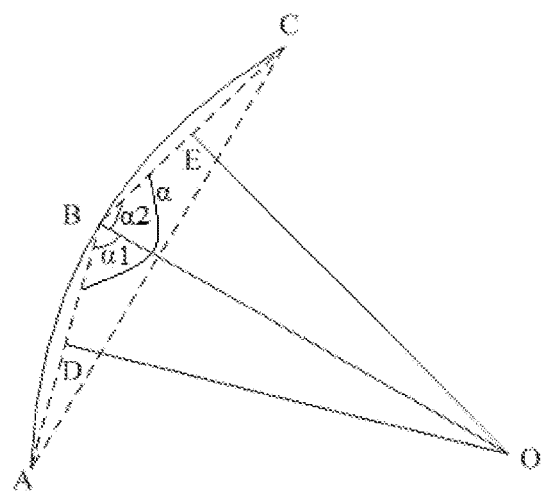
FIG. 4 is a schematic diagram of a curvature radius of a target front road according to an embodiment of the present disclosure.

The length of the first segment is half of the length of the fourth segment. The length of the fourth segment may be determined based on longitude and latitude information on the target path point and longitude and latitude information on a middle point of the target front road. The length of the second segment is half of the length of the fifth segment. The length of the fifth segment may be determined based on longitude and latitude information on a destination of the target front road and longitude and latitude information on a middle point of the target front road. For example, as shown in FIG. 4, the length of BD is half of the length of AB, the length of BE is half of the length of BC, the length of AB may be determined based on the longitude and latitude information on A and B, and the length of BC may be determined based on the longitude and latitude information on B and C.

In another example, for the reference path point on the planning path, in the embodiment, before S202, the method may further include: calculating, based on a length of a sixth segment, a length of a seventh segment and an angle between the sixth segment and the seventh segment, a length of an eight segment as the curvature radius of the reference front road. Two endpoints of the eighth segment are a curvature center and a middle point of the reference front road respectively, the curvature center of the reference front road is an intersection of a third vertical line and a fourth vertical line, the third vertical line is perpendicular to a ninth segment and passes through a middle point of the ninth segment, the fourth vertical line is perpendicular to a tenth segment and passes through a middle point of the tenth segment, two endpoints of the sixth segment are the middle point of the ninth segment and the middle point of the reference front road respectively, two endpoints of the seventh segment are the middle point of the tenth segment and the middle point of the reference front road respectively, two endpoints of the ninth segment are the reference path point and the middle point of the reference front path respectively, and two endpoints of the tenth segment are a destination and the middle point of the reference front road respectively. In an example shown in FIG. 4, if A indicates a reference path point and C indicates a reference destination, a path AC is a reference front road. B is a middle point of the path AC, D is a middle point of AB, E is a middle point of BC, a vertical line of AB passing through D and a vertical line of BC passing through E interest at O, therefore O is a curvature center of the reference front road, DO is sixth vertical line, EO is a seventh vertical line, BD is a sixth segment, BE is a seventh segment, AB is a ninth segment, BC is a tenth segment, and a is an angle between AB and BC, i.e., an angle between the sixth segment and the seventh segment. A length of the eighth segment BO may be calculated based on a length of the sixth segment BD, a length of the seventh segment BE and the angle α between the sixth segment BD and the seventh segment BE. The length of the eighth segment BO is the curvature radius of the reference front road. The eighth segment BO is calculated from the following equations: $\alpha_1+\alpha_2=\alpha$, BD/2 cos $\alpha_1$=BE/2 cos $\alpha_2$=BO, wherein, α1 indicates an angle between AB and BO, and α2 indicates an angle between BC and BO.

It should be understood that, for any path point on the planning path, after a curvature radius of a front road of the path point is determined, an initial planning speed at the path point may be determined based on the curvature radius of the front road of the path point and a preset lateral acceleration threshold. The determined initial planning speed should ensure that a lateral acceleration generated when a vehicle drives at the initial planning speed at the path point does not exceed the lateral acceleration threshold. Since the lateral acceleration generated during a driving process of the vehicle is approximately equal to a ratio of a square of the driving speed of the vehicle and the curvature radius (i.e., $V_x^2$/Radius, where $V_x$ indicates the driving speed of the vehicle, and Radius indicates the curvature radius). Therefore, in some implementations of the embodiment, the initial planning speed at the path point may be calculated from the following equation:

$$v=\sqrt{a_y \times \text{radius}}.$$

Wherein, V indicates the initial planning speed at the path point, $a_y$ indicates the lateral acceleration threshold, and radius indicates the curvature radius of the front road of the path point. For example, for the target path point on the planning path, V may indicate an initial planning speed at the target path point, and radius may indicate a curvature radius of the target front road. For the reference path point on the planning path, V may indicate an initial planning speed at the reference path point, and radius may indicate a curvature radius of the reference front road.

In step 203, a target longitudinal acceleration and a target planning speed at the target path point are determined based on the initial planning speed at the target path point, the initial planning speed at the reference path point and a reference journey, such that the target longitudinal acceleration is in a defined range of longitudinal accelerations. The reference journey indicates a journey from the target path point to the reference path point on the planning path, and the target longitudinal acceleration indicates an acceleration required for a change from the target planning speed to the initial planning speed at the reference path point on the reference journey.

It should be understood that, after initial planning speeds at path points on the planning path are determined, the initial planning speeds at the path points are further adjusted by constraining longitudinal accelerations at the path points, thereby obtaining target planning speeds and target longitudinal accelerations at the path points. This can avoid a too quick vehicle speed due to a too great longitudinal acceleration at the path points, thereby improving safety and a riding comfort during a driving process of the vehicle. In order to ensure vehicle safety and riding comfort, an acceleration generated when a vehicle decelerates can not be too great, therefore the defined range of the longitudinal accelerations may include an acceleration for an accelerated movement and an acceleration for a decelerated movement not exceeding a certain threshold. In a case that a value of a target longitudinal acceleration is in the defined range of the longitudinal accelerations, the vehicle will not generate a great acceleration when decelerating. In practice, the defined range of the longitudinal accelerations may also include an acceleration for an accelerated movement not exceeding a certain threshold. In this case, if the value of the target longitudinal acceleration is in the defined range of the longitudinal accelerations, the vehicle will not generate a great acceleration when accelerating.

Specifically, for the target path point on the planning path, a reference path point may be selected on the planning path based on the target path point, and an initial planning speed at the target path point is adjusted based on the initial planning speed at the reference path point, a preset defined range of longitudinal accelerations and a reference journey between the target path point and the reference point on the planning path, thereby obtaining the target planning speed and the target longitudinal acceleration at the target path point. The reference path point is a path point ahead of a course of the target path point.

In some implementations of the embodiment, the reference path point may be selected based on a preset time threshold. If the reference journey indicates a journey from the target path point to the reference path point on the planning path, the reference journey may be equal to a product of the initial planning speed at the target path point and a preset time threshold. That is, the reference path point for the target path point may be selected as follows. The reference journey at the target path point is calculated based on the initial planning speed at the target path point and the preset time threshold, a destination which the reference path can reach from the target path point as a starting point is searched for on the planning path, and the destination is the reference path point. The preset time threshold may be determined based on empiric values of reaction time of a driver.

It should be noted that, the initial planning speed at the target path point is adjusted, such that the target longitudinal acceleration of the vehicle generated at the target path point on the planning path is in the preset defined range of longitudinal accelerations, thereby ensuring driving safety of the vehicle and riding comfort. The target longitudinal acceleration generated at the target path point may be considered as a longitudinal acceleration generated during a driving process of the vehicle from the target path point o the reference path point on the planning path. The driving speed of the vehicle at the target path point may be considered as a target planning speed at the target path point, and a driving speed of the vehicle at the reference path point may be considered as the initial planning speed at the reference path point. In order to achieve the above adjustment objects, in some implementations of the embodiment, in a case that it is verified that the initial planning speed at the target path point can not achieve the above adjustment object, a target planning speed is determined again for the target path point. Specifically, the step 203 may for example include: calculating an initial longitudinal acceleration based on the initial planning speed at the target path point, the initial planning speed at the reference path point and a reference journey, where the initial longitudinal acceleration indicates an acceleration required for a change from the initial planning speed at the target path point to the initial planning speed at the reference path point on the reference journey; determining the initial longitudinal acceleration at the target path point as the target longitudinal acceleration and determining the initial planning speed at the target path point as the target planning speed, if the initial longitudinal acceleration at the target path point indicates a decelerated movement and an absolute value of the initial longitudinal acceleration at the target path point does not exceed a longitudinal acceleration threshold, or if the initial acceleration at the target path point does not indicate a decelerated movement; and reducing the initial planning speed at the target path point and calculating the initial longitudinal acceleration again, if the initial longitudinal acceleration at the target path point indicates a decelerated movement and the absolute value of the initial longitudinal acceleration at the target path point exceeds the longitudinal acceleration threshold.

The initial longitudinal acceleration may be calculated according to the following equation:

$$a = \frac{V_{t+m}^2 - V_t^2}{2 \times S}.$$

Where, a indicates the initial longitudinal acceleration, $V_{t+m}$ indicates the initial planning speed at the reference path point, $V_t$ indicates the initial planning speed at the target path point, and S indicates the reference journey.

In addition, in a case that the initial longitudinal acceleration at the target path point indicates a decelerated movement and the absolute value of the initial longitudinal acceleration at the target path point exceeds the longitudinal acceleration threshold, the target planning speed at the target path point may be calculated according to the following equation:

$$V_t' = \sqrt{|V_{t+m}^2 - 2 \times a_x \times S|}.$$

Wherein, $a_x$ indicates the longitudinal acceleration threshold, $V_{t+m}$ indicates the initial planning speed at the reference path point, $V_t'$ indicates the target planning speed at the target path point, and S indicates the reference journey. In this case, the target longitudinal acceleration at the target path point is the longitudinal acceleration threshold.

In practice, in addition to controlling the planning vehicle speed at the target path point for a longitudinal acceleration for a decelerated movement, the planning vehicle speed may be controlled at the target path point for a longitudinal acceleration for an accelerated movement. After the initial longitudinal acceleration at the target path point is calculated based on the initial planning speeds at the target path point and the reference path point, the initial longitudinal acceleration at the target path point is determined as the target longitudinal acceleration and the initial planning speed at the target path point is determined as the target planning speed, if the initial longitudinal acceleration at the target path point indicates an accelerated movement and the absolute value of the initial longitudinal acceleration at the target path point does not exceed the longitudinal acceleration threshold, or if the initial acceleration at the target path point does not indicate an accelerated movement. The initial planning speed at the target path point is adjusted and the initial longitudinal acceleration is calculated again, if the initial longitudinal acceleration at the target path point indicates an accelerated movement and the absolute value of the initial longitudinal acceleration at the target path point exceeds the longitudinal acceleration threshold.

In addition, the planning speed may be controlled at the target path point for longitudinal accelerations of both the accelerated movement and the decelerated movement. Specifically, after the initial longitudinal acceleration at the target path point is calculated based on initial planning speeds at the target path point and the reference path point, the initial longitudinal acceleration at the target path point is determined as the target longitudinal acceleration and the initial planning speed at the target path point is determined as the target planning speed, if the absolute value of the initial longitudinal acceleration at the target path point does not exceed the longitudinal acceleration threshold. If the absolute value of the initial longitudinal acceleration at the target path point exceeds the longitudinal acceleration threshold, the initial planning speed at the target path point is adjusted whether the initial longitudinal acceleration indicates an accelerated movement or a decelerated movement, and the initial longitudinal acceleration is calculated again.

It should be noted that, the target longitudinal acceleration and the target planning speed at the target path point determined in step 203 may be stored for the target path point, such that the vehicle speed may be controlled based on the target longitudinal acceleration and the target planning speed stored for the target path point when the vehicle drives to the target path point. In some implementations of the embodiment, after step 203, the method may for example further include: saving the target planning speed and the target longitudinal acceleration into planning information on the target path point, wherein, the planning information on the target path point further includes longitude and latitude information on the target path point.

It should be understood that, during a driving process of the vehicle, the driving of the vehicle may be controlled based on a driving direction and a curvature radius at a path point on the planning path. Therefore, in some implementations of the embodiment, in addition to including the longitude and latitude information on the target path point, the target planning speed at the target path point and the target longitudinal acceleration at the target path point, the planning information on the target path point may further include: a planning course and/or a curvature radius at the target path point, for example. The planning course at the target path point indicates a driving direction at the target path point, and the curvature radius at the target path point is a curvature radius of the target front road.

Figure 5:
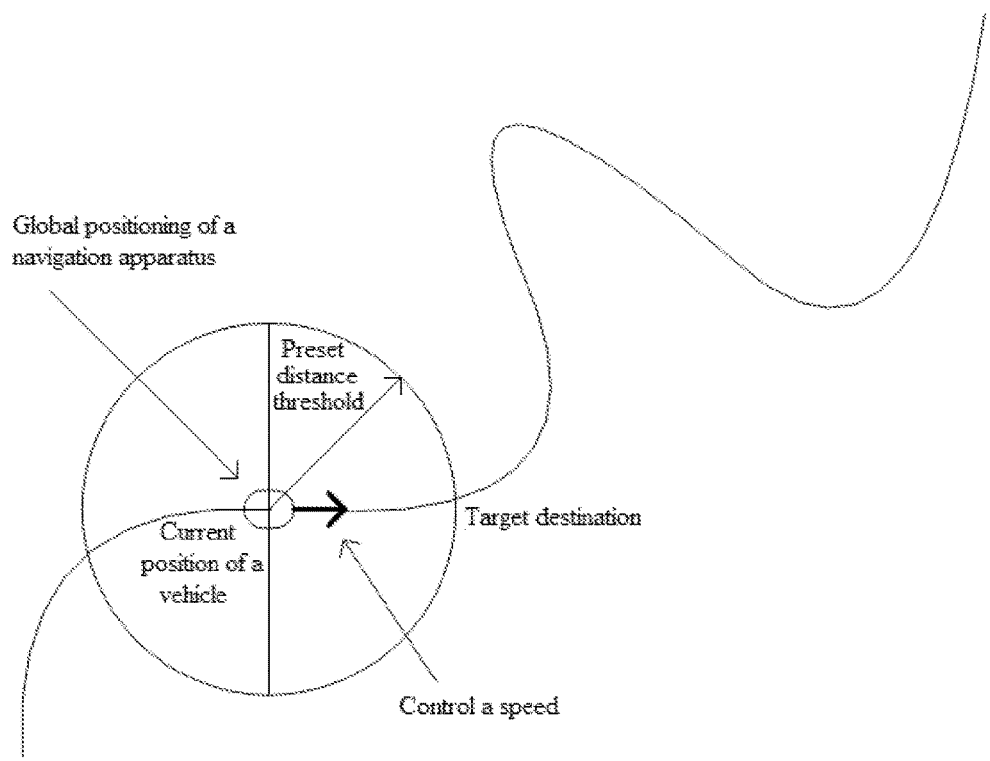
FIG. 5 is a schematic diagram showing that a vehicle actually drives on a target front road according to an embodiment of the present disclosure.

It should be noted that, during an actual driving process of the vehicle, planning information on a corresponding target path point may be extracted from the saved planning information on respective path points based on current position information of the vehicle, thereby controlling the vehicle speed at a current position based on the planning information. Specifically, in some implementations of the embodiment, after the planning information for the target path point is saved, the method may for example further include: acquiring longitude and latitude information on a current driving position during the driving process of the vehicle; extracting longitude and latitude information on the target path point from the planning information on the target path point; and extracting the target planning speed and the target longitude acceleration from the planning information on the target path point and controlling the vehicle speed based on the target planning speed and the target longitudinal acceleration, if the longitude and latitude information on the current driving position matches with the longitude and latitude information on the target path point. For example, as shown in FIG. 5, during the driving process of the vehicle, a longitude and a latitude of a current position where the vehicle is actually located are determined in combination with position information provided by a global positioning system in a navigation apparatus, and the target planning speed and the target longitudinal acceleration in the planning information on the corresponding target path point are obtained based on the longitude and the latitude. Acceleration is achieved by a drive system; slight braking is achieved by reversed towing of an engine or a motor; and braking is achieved by active braking, thereby achieving adaptive cruise control.

It should be understood that, in controlling the vehicle speed, the target planning speed and the target longitudinal acceleration at the target path point may function as the maximum longitudinal speed and the maximum longitudinal acceleration when the vehicle drives at the target path point respectively, for example. In the embodiment, the "lateral" mentioned indicates a direction perpendicular to the driving direction of the vehicle, and the "longitudinal" mentioned indicates the driving direction of the vehicle.

According to the implementations provided by the embodiment, for the target path point on the planning path, the target planning speed and the target longitudinal acceleration at the target path point for controlling the vehicle speed are determined based on the planning path itself, the lateral acceleration threshold and the defined range of the longitudinal accelerations. It follows that, in one aspect, the planning path may be obtained by a navigation apparatus, the navigation apparatus is not like the detection apparatus such as the radar and the camera which can only be used in a certain vehicle speed, therefore the vehicle speed planning can apply to a wider speed range. In the other aspect, in planning a vehicle speed for a target path point, a lateral acceleration at the target path point is limited by the lateral acceleration threshold and a target longitudinal acceleration at the target path point is limited in the defined range of the longitudinal accelerations, such that a vehicle controlled to drive at the target planning speed and the target longitudinal acceleration at the target path point can avoid drastic deceleration and lateral offset, thereby improving driving safety of the vehicle and a riding comfort of passengers in the vehicle and saving energy.

Figure 6:
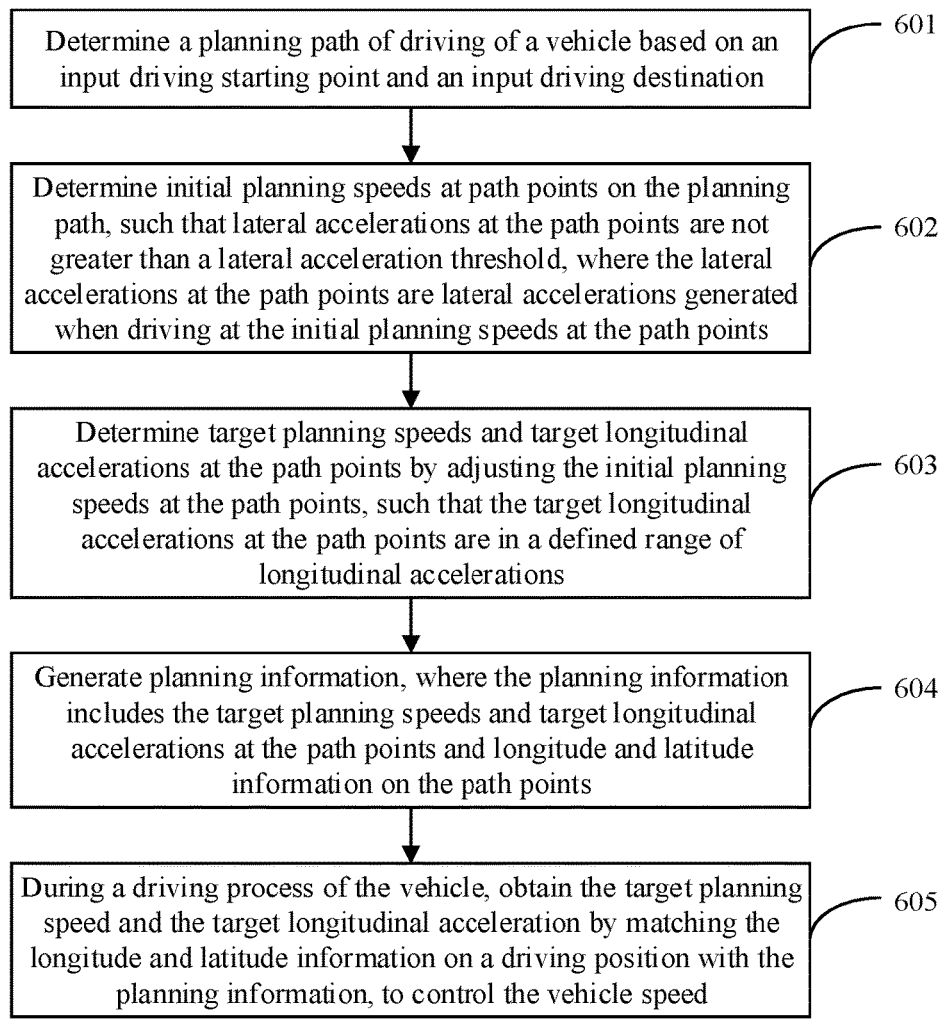
FIG. 6 is a schematic flowchart of another method for planning a vehicle speed according to an embodiment of the present disclosure.

Reference is made to FIG. 6 which shows a schematic flowchart of a method for planning a vehicle speed according to an embodiment of the present disclosure. In the embodiment, the method may include following steps 601 to 605, for example.

In step 601, a planning path for driving of a vehicle is determined based on an input driving starting point and an input driving destination.

In step 602, initial planning speeds at path points on the planning path are determined, such that a lateral acceleration at each of the path points is not greater than a lateral acceleration threshold. The lateral acceleration at the path point is a lateral acceleration generated when driving at the initial planning speed at the path point.

The initial planning speed at the path point may be determined by the manner descried in the above embodiment, which is not described in detail here.

In step 603, a target planning speed and a target longitudinal acceleration at each path point are determined by adjusting the initial planning speed at the path point, such that the target longitudinal acceleration at the path point is in a defined range of longitudinal accelerations.

The target planning speed and the target longitudinal acceleration at the path point may be determined by the manner described in the above embodiment, which is not described in detail here.

In step 604, planning information is generated, wherein the planning information includes the target planning speed and the target longitudinal acceleration at each path point and longitude and latitude information on each path point.

Optionally, in the embodiment, the planning information may further include a planning course and/or a curvature radius at each path point for example.

In step 605, during a driving process of the vehicle, the target planning speed and the target longitudinal acceleration are obtained by matching longitude and latitude information on a driving position with the planning information, so as to control the vehicle speed.

According to the implementations provided by the embodiment, for the path points on the planning path, the planning speed and the longitudinal acceleration at each of the path points for controlling the vehicle speed at the target path point are determined based on the planning path itself, the lateral acceleration threshold and the defined range of the longitudinal accelerations. It follows that, in one aspect, the planning path may be obtained by a navigation apparatus, the navigation apparatus is not like the detection apparatus such as the radar and the camera which can only be used in a certain vehicle speed, therefore the vehicle speed planning can apply to a wider speed range. In the other aspect, in planning a vehicle speed for each path point, a lateral acceleration at the path point is limited by the lateral acceleration threshold and a longitudinal acceleration at the path point is limited in the defined range of the longitudinal accelerations, such that a vehicle controlled to drive at the planning speeds and the planning longitudinal accelerations at the path points can avoid drastic deceleration and lateral offset, thereby improving driving safety of the vehicle and a riding comfort of passengers in the vehicle and saving energy.

Figure 7:
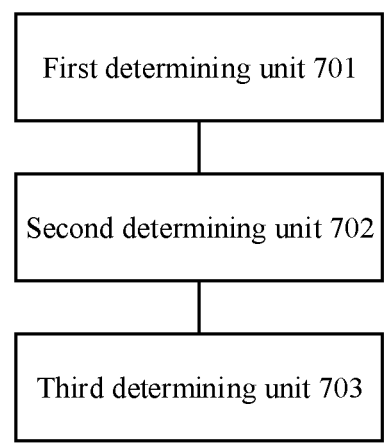
FIG. 7 is a schematic structural diagram of a device for planning a vehicle speed according to an embodiment of the present disclosure.

Reference is made to FIG. 7 which shows a schematic structural diagram of a device for planning a vehicle speed according to an embodiment of the present disclosure. In the embodiment, the device may include a first determining unit 701, a second determining unit 702 and a third determining unit 703.

The first determining unit 701 is configured to determine an initial planning speed at a target path point based on a curvature radius of a target front road, such that a first lateral acceleration is not greater than a lateral acceleration threshold. The target front road is a segment of path taking the target path point as a starting point on a planning path, and the first lateral acceleration is a lateral acceleration generated when driving at the initial planning speed at the target path point on the target front road.

The second determining unit 702 is configured to determine an initial planning speed at a reference path point based on a curvature radius of a reference front road, such that a second lateral acceleration is not greater than the lateral acceleration threshold. The reference front road is a segment of path taking the reference path point as a starting point on the planning path, and the second lateral acceleration is a lateral acceleration generated when driving at the initial planning speed at the reference path point on the reference front road.

The third determining unit 703 is configured to determine a target longitudinal acceleration and a target planning speed at the target path point based on the initial planning speed at the target path point, the initial planning speed at the reference path point and a reference journey, such that the target longitudinal acceleration is in a defined range of longitudinal accelerations. The reference journey indicates a journey from the target path point to the reference path point on the planning path, and the target longitudinal acceleration indicates an acceleration required for a change from the target planning speed to the initial planning speed at the reference path point on the reference journey.

Optionally, a target destination is a first initial destination which is closest to the target path point on the planning path, the target destination is a destination of the target front road, and a straight-line distance between the first initial destination and the target path point is equal to a preset distance threshold. A reference destination is a second initial destination which is closest to the reference path point on the planning path, the reference destination is a destination of the reference front road, and the a straight-line distance between the second initial destination and the reference path point is equal to the preset distance threshold.

Optionally, the device may further include a first calculating unit and a second calculating unit for example.

The first calculating unit is configured to calculate, based on a length of a first segment, a length of a second segment and an angle between the first segment and the second segment, a length of a third segment as the curvature radius of the target front road. Two endpoints of the third segment are a curvature center and a middle point of the target front road respectively, the curvature center of the target front road is an intersection of a first vertical line and a second vertical line, the first vertical line is perpendicular to a fourth segment and passes through a middle point of the fourth segment, the second vertical line is perpendicular to a fifth segment and passes through a middle point of the fifth segment, two endpoints of the first segment are the middle point of the fourth segment and the middle point of the target front road respectively, two endpoints of the second segment are the middle point of the fifth segment and the middle point of the target front road respectively, two endpoints of the fourth segment are the target path point and the middle point of the target front road respectively, and two endpoints of the fifth segment are a destination and the middle point of the target front road respectively.

The second calculating unit is configured to calculate, based on a length of a sixth segment, a length of a seventh segment and an angle between the sixth segment and the seventh segment, a length of an eight segment as the curvature radius of the reference front road. Two endpoints of the eighth segment are a curvature center and a middle point of the reference front road respectively, the curvature center of the reference front road is an intersection of a third vertical line and a fourth vertical line, the third vertical line is perpendicular to a ninth segment and passes through a middle point of the ninth segment, the fourth vertical line is perpendicular to a tenth segment and passes through a middle point of the tenth segment, two endpoints of the sixth segment are the middle point of the ninth segment and the middle point of the reference front road respectively, two endpoints of the seventh segment are the middle point of the tenth segment and the middle point of the reference front road respectively, two endpoints of the ninth segment are the reference path point and the middle point of the reference front path respectively, and two endpoints of the tenth segment are a destination and the middle point of the reference front road respectively.

Optionally, the reference journey is equal to a product of the initial planning speed at the target path point and a preset time threshold.

Optionally, the third determining unit 703 may include a calculating subunit, a determining subunit and a decelerating subunit for example.

The calculating subunit is configured to calculate an initial longitudinal acceleration based on the initial planning speed at the target path point, the initial planning speed at the reference path point and the reference journey. The initial longitudinal acceleration indicates an acceleration required for a change from the initial planning speed at the target path point to the initial planning speed at the reference path point on the reference journey.

The determining subunit is configured to determine the initial longitudinal acceleration at the target path point as the target longitudinal acceleration and determine the initial planning speed at the target path point as the target planning speed, if the initial longitudinal acceleration at the target path point indicates a decelerated movement and an absolute value of the initial longitudinal acceleration at the target path point does not exceed a longitudinal acceleration threshold, or if the initial longitudinal acceleration at the target path point does not indicate a decelerated movement.

The decelerating subunit is configured to reduce the initial planning speed at the target path point and trigger the calculating subunit, if the initial longitudinal acceleration at the target path point indicates a decelerated movement and the absolute value of the initial longitudinal acceleration at the target path point exceeds the longitudinal acceleration threshold.

Optionally, the device may further include:
a saving unit configured to save the target planning speed and the target longitudinal acceleration into planning information on the target path point, where the planning information on the target path point further includes longitude and latitude information on the target path point.

Optionally, the planning information on the target path point may further include a planning course and/or the curvature radius at the target path point, the planning course at the target path point may indicate a driving direction at the target path point, and the curvature radius at the target path point may be the curvature radius of the target front road.

Optionally, the device may further include:
an acquiring unit configured to acquire longitude and latitude information on a current driving position during a driving process of a vehicle;
an extracting unit configured to extract the longitude and latitude information on the target path point from the planning information on the target path point; and
a vehicle speed controlling unit configured to extract the target planning speed and the target longitudinal acceleration from the planning information on the target path point and control the vehicle speed based on the target planning speed and the target longitudinal acceleration, if the longitude and latitude information on the current driving position matches with the longitude and latitude information on the target path point.

According to the implementations provided by the embodiment, for the target path point on the planning path, the target planning speed and the target longitudinal acceleration at the target path point for controlling the vehicle speed are determined based on the planning path itself, the lateral acceleration threshold and the defined range of the longitudinal accelerations. It follows that, in one aspect, the planning path may be obtained by a navigation apparatus, the navigation apparatus is not like the detection apparatus such as the radar and the camera which can only be used in a certain vehicle speed, therefore the vehicle speed planning can apply to a wider speed range. In the other aspect, in planning a vehicle speed for a target path point, a lateral acceleration at the target path point is limited by the lateral acceleration threshold and a target longitudinal acceleration at the target path point is limited in the defined range of the longitudinal accelerations, such that a vehicle controlled to drive at the target planning speed and the target longitudinal acceleration at the target path point can avoid drastic deceleration and lateral offset, thereby improving driving safety of the vehicle and a riding comfort of passengers in the vehicle and saving energy.

Figure 8:
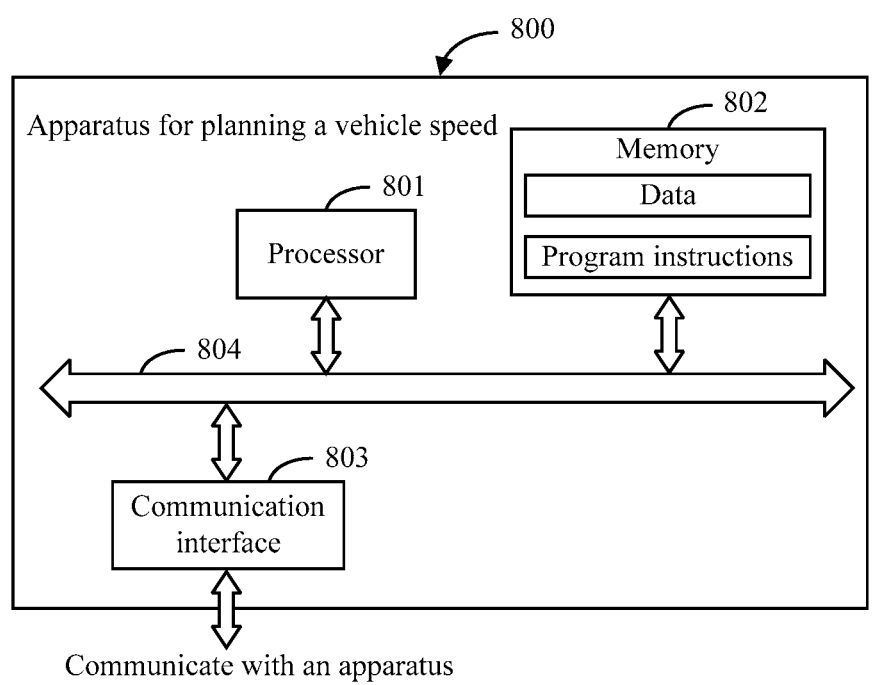
FIG. 8 is a schematic structural diagram of an apparatus for planning a vehicle speed according to an embodiment of the present disclosure.

Reference is made to FIG. 8 which shows a schematic structural diagram of an apparatus for planning a vehicle speed according to an embodiment of the present disclosure. In the embodiment, an apparatus 800 may include a processor 801, a memory 802, a communication interface 803 and a bus system 804.

The bus system 804 is configured to couple hardware components of the apparatus together.

The communication interface 803 is configured to perform communication connection between the apparatus and at least one other apparatus.

The memory 802 is configured to store program instructions and data.

The processor 801 is configured to read the instructions and the data stored in the memory to:
determine, based on a curvature radius of a target front road, an initial planning speed at a target path point, such that a first lateral acceleration is not greater than a lateral acceleration threshold, where the target front road is a segment of path taking the target path as a starting point on a planning path, and the first lateral acceleration is an acceleration generated when driving at the initial planning speed at the target path point on the target front road;
determine, based on a curvature radius of a reference front road, an initial planning speed at a reference path point, such that a second lateral acceleration is not greater than the lateral acceleration threshold, where the reference front road is a segment of path taking the reference path point as a starting point on the planning path, and the second lateral acceleration is a lateral acceleration generated when driving at the initial planning speed at the reference path point on the reference front path; and
determine a target longitudinal acceleration and a target planning speed at the target path point based on the initial planning speed at the target path point, the initial planning speed at the reference path point and a reference journey, such that the target longitudinal acceleration is in a defined range of longitudinal accelerations, where the reference journey indicates a journey from the target path point to the reference path point on the planning path, and the target longitudinal acceleration indicates an acceleration required for a change from the target planning speed to the initial planning speed at the reference path point on the reference journey.

Optionally, a target destination may be a first initial destination which is closest to the target path point on the planning path, the target destination may be a destination of the target front road, and a straight-line distance between the first initial destination and the target path point may be equal to a preset distance threshold; and a reference destination may be a second initial destination which is closest to the reference path point on the planning path, the reference destination may be a destination of the reference front road, and a straight-line distance between the second initial destination and the reference path point may be equal to the preset distance threshold.

Optionally, the processor 801 may be further configured to:

Calculate, based on a length of a first segment, a length of a second segment and an angle between the first segment and the second segment, a length of a third segment as the curvature radius of the target front road, where two endpoints of the third segment are a curvature center and a middle point of the target front road respectively, the curvature center of the target front road is an intersection of a first vertical line and a second vertical line, the first vertical line is perpendicular to a fourth segment and passes through a middle point of the fourth segment, the second vertical line is perpendicular to a fifth segment and passes through a middle point of the fifth segment, two endpoints of the first segment are the middle point of the fourth segment and the middle point of the target front road respectively, two endpoints of the second segment are the middle point of the fifth segment and the middle point of the target front road respectively, two endpoints of the fourth segment are the target path point and the middle point of the target front road respectively, and two endpoints of the fifth segment are a destination and the middle point of the target front road respectively; and Calculate, based on a length of a sixth segment, a length of a seventh segment and an angle between the sixth segment and the seventh segment, a length of an eight segment as the curvature radius of the reference front road, where two endpoints of the eighth segment are a curvature center and a middle point of the reference front road respectively, the curvature center of the reference front road is an intersection of a third vertical line and a fourth vertical line, the third vertical line is perpendicular to a ninth segment and passes through a middle point of the ninth segment, the fourth vertical line is perpendicular to a tenth segment and passes through a middle point of the tenth segment, two endpoints of the sixth segment are the middle point of the ninth segment and the middle point of the reference front road respectively, two endpoints of the seventh segment are the middle point of the tenth segment and the middle point of the reference front road respectively, two endpoints of the ninth segment are the reference path point and the middle point of the reference front path respectively, and two endpoints of the tenth segment are a destination and the middle point of the reference front road respectively.

Optionally, the reference journey may be equal to a product of the initial planning speed at the target path point and a preset time threshold.

Optionally, in order to determine the target longitudinal acceleration and the target planning speed at the target path point, the processor 801 is configured to:

calculate an initial longitudinal acceleration based on the initial planning speed at the target path point, the initial planning speed at the reference path point and the reference journey, where the initial longitudinal acceleration indicates an acceleration required for a change from the initial planning speed at the target path point to the initial planning speed at the reference path point on the reference journey;

determine the initial longitudinal acceleration at the target path point as the target longitudinal acceleration and determine the initial planning speed at the target path point as the target planning speed, if the initial longitudinal acceleration at the target path point indicates a decelerated movement and an absolute value of the initial longitudinal acceleration at the target path point does not exceed a longitudinal acceleration threshold, or if the initial longitudinal acceleration at the target path point does not indicate a decelerated movement; and reduce the initial planning speed at the target path point and calculate the initial longitudinal acceleration again, if the initial longitudinal acceleration at the target path point indicates the decelerated movement and the absolute value of the initial longitudinal acceleration at the target path point exceeds the longitudinal acceleration threshold.

Optionally, the processor 801 may be further configured to:

save the target planning speed and the target longitudinal acceleration into planning information on the target path point. The planning information on the target path point further includes longitude and latitude information on the target path point.

The planning information on the target path point may further include a planning course and/or the curvature radius at the target path point, the planning course at the target path point may indicate a driving direction at the target path point, and the curvature radius at the target path point may be the curvature radius of the target front road.

Optionally, the processor 801 may be further configured to:

acquire longitude and latitude information on a current driving position during a driving process of a vehicle;

extract the longitude and latitude information on the target path point from the planning information on the target path point; and extract the target planning speed and the target longitudinal acceleration from the planning information on the target path point and control the vehicle speed based on the target planning speed and the target longitudinal acceleration, if the longitude and latitude information on the current driving position matches with the longitude and latitude information on the target path point.

According to the implementations provided by the embodiment, for the target path point on the planning path, the target planning speed and the target longitudinal acceleration at the target path point for controlling the vehicle speed are determined based on the planning path itself, the lateral acceleration threshold and the defined range of the longitudinal accelerations. It follows that, in one aspect, the planning path may be obtained by a navigation apparatus, the navigation apparatus is not like the detection apparatus such as the radar and the camera which can only be used in a certain vehicle speed, therefore the vehicle speed planning can apply to a wider speed range. In the other aspect, in planning a vehicle speed for a target path point, a lateral acceleration at the target path point is limited by the lateral acceleration threshold and a target longitudinal acceleration at the target path point is limited in the defined range of the longitudinal accelerations, such that a vehicle controlled to drive at the target planning speed and the target longitudinal acceleration at the target path point can avoid drastic deceleration and lateral offset, thereby improving driving safety of the vehicle and a riding comfort of passengers in the vehicle and saving energy.

"First" in the terms "a first initial destination", "a first segment" and "a first determining unit" mentioned in the embodiments of the present disclosure is only used to indicate names and does not indicate the first in order. The rule also applies to "second" and "third" and so on.

According to the description of the above embodiments, those skilled in the art may clearly know that all or a part of steps in the methods according to the above embodiments may be implemented by means of software in combination with a general-purpose hardware platform. Based on such understanding, the technical solution of the present disclosure may be embodied as a computer software product, and the computer software product may be stored in a storage medium such as a read-only memory (ROM)/RAM, a magnetic disk and an optical disk. The computer software product includes several instructions to enable a computer device (which may be a personal computer, a server or a network communication apparatus such as a router) to perform the methods described according to the embodiments of the present disclosure or some parts of the embodiments.

Various embodiments in the specification are described in a progressive manner, and each embodiment lays emphasis on differences from other embodiments. For the same or similar parts between the embodiments, one may refer to the description of other embodiments. For the method embodiments and the apparatus embodiments, since they are similar to the system embodiment, the description thereof is simple. For the part of the method embodiment and the apparatus embodiment related to the system embodiment, one may refer to the description of the system embodiment. The apparatus embodiments and system embodiments described above are only schematic, the modules illustrated as separate components may be physically separated or not, and components displayed as modules may be physical modules or not, that is, the components may be located at a same place or distributed to multiple network units. The object of the solutions of the embodiments may be achieved by selecting a part or all of the modules as needed. Those skilled in the art may understand and practice the present disclosure without any creative work.

The preferred embodiments of the present disclosure are described above and are not used to limit the scope of protection of the present disclosure. It should be noted that, those skilled in the art may make several improvements and modifications without departing the scope of the present disclosure, and the improvements and modifications should be regarded as falling within the scope of protection of the present disclosure.

The invention claimed is:

1. A method for planning a vehicle speed, comprising:
    determining, based on a curvature radius of a target front road, an initial planning speed at a target path point, to ensure that a first lateral acceleration is not greater than a lateral acceleration threshold, wherein the target front road is a segment of path taking the target path point as a starting point on a planning path, and the first lateral acceleration is a lateral acceleration generated when driving at the initial planning speed at the target path point on the target front road;
    determining, based on a curvature radius of a reference front road, an initial planning speed at a reference path point, to ensure that a second lateral acceleration is not greater than the lateral acceleration threshold, wherein the reference front road is a segment of path taking the reference path point as a starting point on the planning path, and the second lateral acceleration is a lateral acceleration generated when driving at the initial planning speed at the reference path point on the reference front road;
    determining a target planning speed at the target path point by adjusting the initial planning speed at the target path point based on the initial planning speed at the reference path point, a defined range of longitudinal accelerations and a reference journey, and determining a target longitudinal acceleration corresponding to the target planning speed at the target path point, to ensure that the target longitudinal acceleration is in the defined range of longitudinal accelerations, wherein the reference journey indicates a journey from the target path point to the reference path point on the planning path, and the target longitudinal acceleration indicates an acceleration required for a change from the target planning speed to the initial planning speed at the reference path point on the reference journey; and
    controlling the vehicle speed based on the target planning speed and the target longitudinal acceleration at the target path point,
    wherein the planning path is obtained by a navigation apparatus.

2. The method according to claim 1, wherein,
    a target destination is a first initial destination which is closest to the target path point on the planning path, the target destination is a destination of the target front road, and a straight-line distance between the first initial destination and the target path point is equal to a preset distance threshold; and
    a reference destination is a second initial destination which is closest to the reference path point on the planning path, the reference destination is a destination of the reference front road, and a straight-line distance between the second initial destination and the reference path point is equal to the preset distance threshold.

3. The method according to claim 1, further comprising:
    calculating, based on a length of a first segment, a length of a second segment and an angle between the first segment and the second segment, a length of a third segment as the curvature radius of the target front road, wherein the target path point and a middle point of the target front path are two endpoints of a fourth segment respectively, a destination and a middle point of the target front road are two endpoints of a fifth segment are respectively, a middle point of the fourth segment and the middle point of the target front road are two endpoints of the first segment respectively, a middle point of the fifth segment and the middle point of the target front road are two endpoints of the second segment are respectively, a first vertical line is perpendicular to the fourth segment and passes through the middle point of the fourth segment, a second vertical line is perpendicular to the fifth segment and passes through the middle point of the fifth segment, a curvature center of the target front road is an intersection of the first vertical line and the second vertical line, and the curvature center and the middle point of the target front road are two endpoints of the third segment are respectively; and
    calculating, based on a length of a sixth segment, a length of a seventh segment and an angle between the sixth segment and the seventh segment, a length of an eight segment as the curvature radius of the reference front road, wherein the reference path point and a middle point of the reference front path are two endpoints of a ninth segment respectively, and a destination and the middle point of the reference front road are two endpoints of a tenth segment respectively, a middle point of the ninth segment and the middle point of the reference front road are two endpoints of the sixth segment respectively, a middle point of the tenth segment and the middle point of the reference front road are two endpoints of the seventh segment respectively, a third vertical line is perpendicular to the ninth segment and passes through the middle point of the ninth segment, a fourth vertical line is perpendicular to the tenth segment and passes through the middle point of the tenth segment, a curvature center of the reference front road is an intersection of the third vertical line and the fourth vertical line, and the curvature center and the middle point of the reference front road are two endpoints of the eighth segment respectively.

4. The method according to claim 1, wherein the reference journey is equal to a product of the initial planning speed at the target path point and a preset time threshold.

5. The method according to claim 1, wherein the determining the target longitudinal acceleration and the target planning speed at the target path point based on the initial planning speed at the target path point, the initial planning speed at the reference path point and a reference journey, to ensure that the target longitudinal acceleration is in the defined range of longitudinal accelerations comprises:
calculating an initial longitudinal acceleration based on the initial planning speed at the target path point, the initial planning speed at the reference path point and the reference journey, wherein the initial longitudinal acceleration indicates an acceleration required for a change from the initial planning speed at the target path point to the initial planning speed at the reference path point on the reference journey;
determining the initial longitudinal acceleration at the target path point as the target longitudinal acceleration and determining the initial planning speed at the target path point as the target planning speed, if the initial longitudinal acceleration at the target path point indicates a decelerated movement and an absolute value of the initial longitudinal acceleration at the target path point does not exceed a longitudinal acceleration threshold, or if the initial longitudinal acceleration at the target path point does not indicate a decelerated movement; and
reducing the initial planning speed at the target path point and calculating the initial longitudinal acceleration again, if the initial longitudinal acceleration at the target path point indicates the decelerated movement and the absolute value of the initial longitudinal acceleration at the target path point exceeds the longitudinal acceleration threshold.

6. The method according to claim 1, further comprising:
saving the target planning speed and the target longitudinal acceleration into planning information on the target path point, wherein the planning information on the target path point further comprises longitude and latitude information on the target path point.

7. The method according to claim 6, wherein the planning information on the target path point further comprises a planning course and/or the curvature radius at the target path point, the planning course at the target path point indicates a driving direction at the target path point, and the curvature radius at the target path point is the curvature radius of the target front road.

8. The method according to claim 6, further comprising:
acquiring longitude and latitude information on a current driving position during a driving process of a vehicle;
extracting the longitude and latitude information on the target path point from the planning information on the target path point; and
extracting the target planning speed and the target longitudinal acceleration from the planning information on the target path point and controlling the vehicle speed based on the target planning speed and the target longitudinal acceleration, if the longitude and latitude information on the current driving position matches with the longitude and latitude information on the target path point.

9. A device for planning a vehicle speed, comprising:
a first determining processor, configured to determine, based on a curvature radius of a target front road, an initial planning speed at a target path point, to ensure that a first lateral acceleration is not greater than a lateral acceleration threshold, wherein the target front road is a segment of path taking the target path point as a starting point on a planning path, and the first lateral acceleration is a lateral acceleration generated when driving at the initial planning speed at the target path point on the target front road;
a second determining processor, configured to determine, based on a curvature radius of a reference front road, an initial planning speed at a reference path point, to ensure that a second lateral acceleration is not greater than the lateral acceleration threshold, wherein the reference front road is a segment of path taking the reference path point as a starting point on the planning path, and the second lateral acceleration is a lateral acceleration generated when driving at the initial planning speed at the reference path point on the reference front road;
a third determining processor, configured to determine a target planning speed at the target path point by adjusting the initial planning speed at the target path point based on the initial planning speed at the reference path point, a defined range of longitudinal accelerations and a reference journey, and determine a target longitudinal acceleration corresponding to the target planning speed at the target path point, to ensure that the target longitudinal acceleration is in the defined range of longitudinal accelerations, wherein the reference journey indicates a journey from the target path point to the reference path point on the planning path, and the target longitudinal acceleration indicates an acceleration required for a change from the target planning speed to the initial planning speed at the reference path point on the reference journey; and
a vehicle speed controlling processor, configured to control the vehicle speed based on the target planning speed and the target longitudinal acceleration at the target path point,
wherein the first determining processor and the second determining processor are electrically connected to the third determining processor, and the third determining processor is electrically connected to the vehicle speed controlling processor, the planning path is obtained by a navigation apparatus.

10. An apparatus for planning a vehicle speed, comprising a processor, a memory, a communication interface and a bus system, wherein
the bus system is configured to couple hardware components of the apparatus together;
the communication interface is configured to perform communication connection between the apparatus and at least one other apparatus;
the memory is configured to store program instructions and data; and
the processor is configured to read the instructions and the data stored in the memory to:
determine, based on a curvature radius of a target front road, an initial planning speed at a target path point, to ensure that a first lateral acceleration is not greater than a lateral acceleration threshold, wherein the target front road is a segment of path taking the target path point as a starting point on a planning path, and the first lateral acceleration is a lateral acceleration generated when driving at the initial planning speed at the target path point on the target front road;

determine, based on a curvature radius of a reference front road, an initial planning speed at a reference path point, to ensure that a second lateral acceleration is not greater than the lateral acceleration threshold, wherein the reference front road is a segment of path taking the reference path point as a starting point on the planning path, and the second lateral acceleration is a lateral acceleration generated when driving at the initial planning speed at the reference path point on the reference front path;

determine a target longitudinal acceleration and a target planning speed at the target path point by adjusting the initial planning speed at the target path point based on the initial planning speed at the reference path point, a defined range of longitudinal accelerations and a reference journey, and determine a target longitudinal acceleration corresponding to the target planning speed at the target path point, to ensure that the target longitudinal acceleration is in the defined range of longitudinal accelerations, wherein the reference journey indicates a journey from the target path point to the reference path point on the planning path, and the target longitudinal acceleration indicates an acceleration required for a change from the target planning speed to the initial planning speed at the reference path point on the reference journey; and control the vehicle speed based on the target planning speed and the target longitudinal acceleration at the target path point, wherein the planning path is obtained by a navigation apparatus.

* * * * *